Feb. 16, 1937.  J. H. HARLOW  2,071,120
MAGNIFYING AND VIEWING DEVICE
Filed April 23, 1936  2 Sheets—Sheet 1
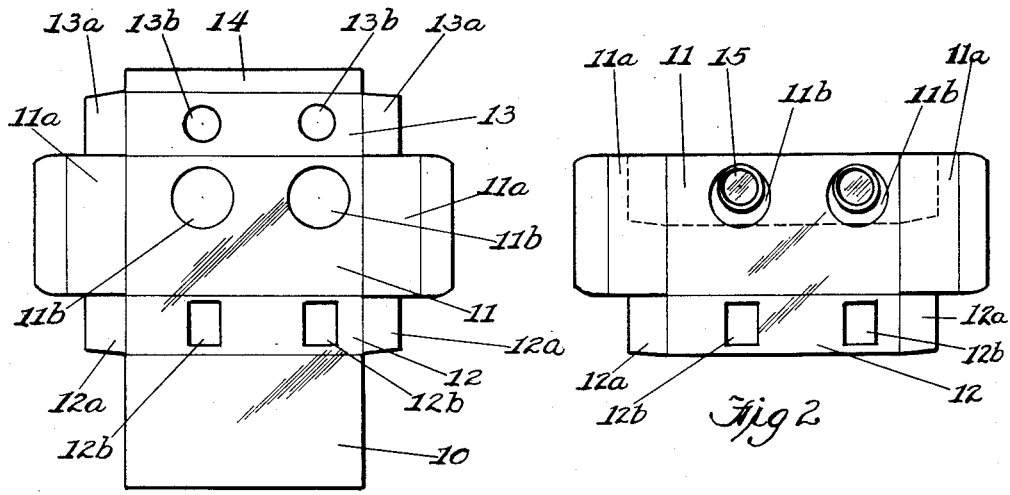
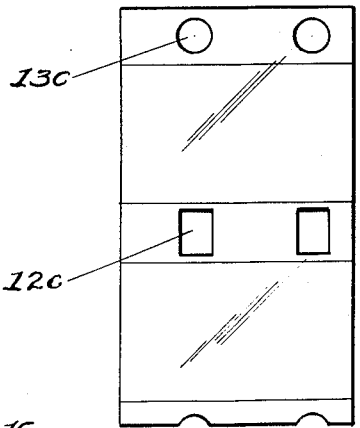
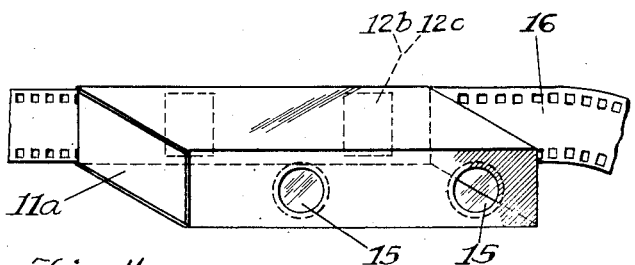
Inventor
Jesse Hancock Harlow
Benj. 2 Roodhouse
Atty Feb. 16, 1937. J. H. HARLOW 2,071,120
MAGNIFYING AND VIEWING DEVICE
Filed April 23, 1936   2 Sheets-Sheet 2

Inventor
Jesse Hancock Harlow

Benj J. Roodhouse Atty.

Patented Feb. 16, 1937

2,071,120

UNITED STATES PATENT OFFICE 2,071,120

MAGNIFYING AND VIEWING DEVICE

Jesse Hancock Harlow, Chicago, Ill., assignor of one-half to Louise W. Denman, Wilmette, Ill.

Application April 23, 1936, Serial No. 75,957

3 Claims. (Cl. 40—28)

My present invention relates to the provision of a magnifying and viewing device for pictures illuminated by transmitted light.

It has already become known that views of a high degree of excellence for viewing by means of transmitted light can be produced and offered to the public at an attractive figure upon ribbons or strips of film such as is employed with motion pictures. Such pictures are of such small scale, however, that it is necessary to magnify them as well as to illuminate them with transmitted light in order to be able to view them with ease and satisfaction.

Applicant has already provided a simple and fairly economical magnifying and viewing device, but in the marketing of views and the viewing device he has discovered that in order to get a satisfactory distribution to certain classes of the public it is necessary to simplify the construction of the magnifying and viewing device so that it may be manufactured at such an economical figure as will permit a very considerable reduction of price in offering the device to the public.

I have accomplished the foregoing object by means of the structure illustrated in the accompanying drawings which will permit of the production of a magnifying and viewing device for transparencies that will perform the functions required of it without impaired efficiency and may be formed from sheets of suitable material by means of a punching and a gluing operation, as cartons and boxes are formed at an extremely economical figure.

In the drawings—

Fig. 1 is a development of the inner lens holding element showing the lines upon which the same is folded to form the inner rectangular box shaped part of the device.

Fig. 2 shows how the development in Fig. 1, after gluing, is flattened down to permit the mounting of the lenses.

Fig. 3 is a development or blank from which the exterior or closing member is formed within which the interior member telescopes.

Fig. 4 illustrates how the interior and enclosing members, when assembled, provide a guideway for positioning and moving the film.

Similar reference characters refer to similar parts throughout the respective views.

Figure 5:
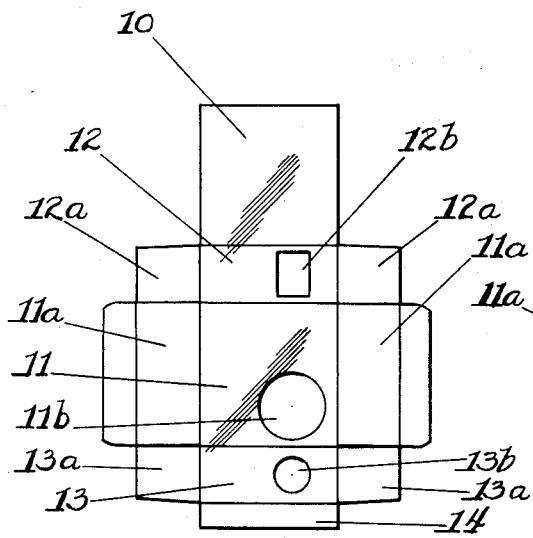
Figs. 5, 6, 7 and 8 are respectively the same as Figs. 1 to 4, inclusive, except the structure in the latter figures is for monocular instead of binocular vision.
Figure 6:
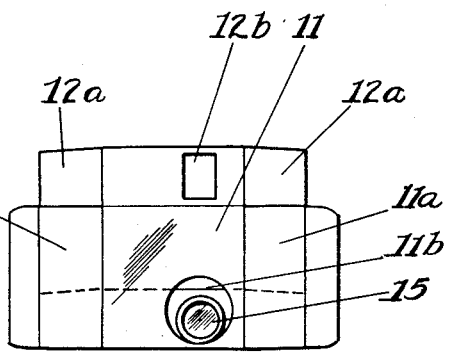
Figure 8:
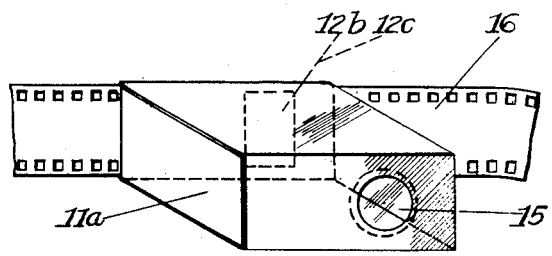
Figure 7:
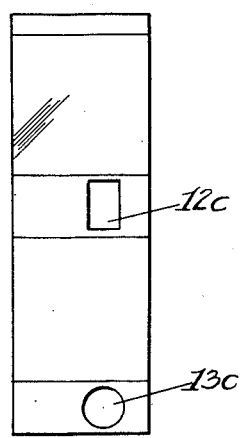

The development or blank shown in Figs. 1 and 5 provides a top 10, bottom 11, sides 12 and 13, together with the gluing strip 14, which when folded along the lines which separate these portions and the glueing strip 14, is glued to the unattached edge of the top 10, provides the top, bottom and sides of a rectangular prism. Flaps 12a and 13a extending from the ends of the sides 12 and 13 in connection with the two part flaps 11a, extending from opposite ends of the bottom 11, provide the ends for the rectangular prism.

In the side 12 are provided, preferably, rectangular apertures 12b past which the film is drawn, as hereinafter described. The apertures 12b are spaced a distance apart so an average pair of eyes may easily see through them at the same time, but these apertures 12b are different distances from the transverse center of the prism.

In the side 13 are provided round openings 13b which align with the openings 12b in the opposite side.

In the bottom, apertures 11b are provided which are considerably larger than the apertures 13b and which register with the apertures 11b when the structure is folded down as is shown in Fig. 2, so that the lenses 15 may be introduced through the apertures 11b and cemented or glued to the sides 13 in front of the apertures 13b.

The enclosing element shown in Fig. 3 is practically the same as the enclosed element except that there are no end flaps so that the inner element enters the open ends and telescopes within the enclosing member.

In the sides of the enclosing member are apertures 12c and 13c which register with the apertures 12b and 13b of the inner member when the inner member is introduced into the enclosing member in the proper way, but, as heretofore indicated, the location of the apertures is unsymmetrical with respect to the center of the device so that by removing and inserting the inner member in an opposite position from that in which registry of the apertures is secured, it will be found that these apertures no longer register and are closed against the admission of dust or foreign material and in better arrangement for shipping and carrying about. The inner member is not only sufficiently smaller so that it may easily enter the outer member, but is sufficiently smaller to accommodate the strip of view carrying film 16 between the sides in which are respectively provided the apertures 12b and 12c.

It will now be perceived that I have provided a magnifying and viewing device of such simple structure that the mechanical operations necessary in forming and assembling it are very few in number and simple in variety so that the cost of manufacture is very low, while, at the same time, the device will function for illuminating, magnifying and viewing pictures of this class quite as effectively as a number of varieties of much more expensive instruments.

Having described my invention what I claim is new and desire to secure by Letters Patent is:

1. A magnifying and viewing device for transparencies printed upon a ribbon of film comprising a rectangular hollow prism having aligning apertures in the opposite sides, said apertures being disposed unsymmetrically with respect to the center of said prism and an enclosing prism, without ends, into which said first mentioned prism is adapted to telescope, said enclosing prism being provided with apertures registering with the apertures in the enclosed prism, whereby there is provided a film channel adjacent the apertures on one of the sides and lenses mounted within the enclosed prism in front of the apertures in the side opposite to the location of the film guide.

2. A device for illuminating, magnifying and viewing views illuminated by transmitted light, printed upon a strip or ribbon of film comprising a carton consisting of an inner hollow rectangular prism and an outer similar prism without ends within which said inner prism is adapted to telescope, said inner prism comprising a sheet of suitable material which may be folded and glued upon one edge to form top and bottom and sides and having laterally extending tangs or flaps adapted to be folded to provide the ends, said sheet being provided with aligning apertures in three of its walls through one of which apertures lenses may be introduced and mounted in front of the apertures in an adjacent wall.

3. A device for illuminating, magnifying and viewing views adapted to be illuminated with transmitted light provided upon a strip or ribbon of film, comprising a hollow rectangular prism with aligning apertures in opposite walls, a lens mounted adjacent and in front of one aperture and an enclosing prism, without ends, provided with apertures in opposite sides adapted to register with the apertures provided in the enclosed prism, whereby there is provided adjacent the aperture opposite to the one provided with a lens, a slot and guideway for receiving and moving the view carrying ribbon.

JESSE HANCOCK HARLOW.